United States Patent
Tomczak et al.

(10) Patent No.: US 9,663,074 B2
(45) Date of Patent: May 30, 2017

(54) METHOD FOR OPERATING A BRAKE SYSTEM IN A STATIONARY VEHICLE

(71) Applicant: Ford Global Technologies, LLC, Dearborn, MI (US)

(72) Inventors: Peter Tomczak, Boppard (DE); Ludwig Fein, Wermelskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/944,404

(22) Filed: Jul. 17, 2013

(65) Prior Publication Data
US 2014/0052356 A1 Feb. 20, 2014

(30) Foreign Application Priority Data

Aug. 16, 2012 (DE) .................. 10 2012 214 550

(51) Int. Cl.
*B60T 7/04* (2006.01)
*B60T 7/06* (2006.01)
*B60T 8/48* (2006.01)

(52) U.S. Cl.
CPC ..... *B60T 7/06* (2013.01); *B60T 7/04* (2013.01); *B60T 8/4863* (2013.01)

(58) Field of Classification Search
CPC ..... B60T 3/00; B60T 7/00; B60T 7/04; B60T 7/06; B60T 7/08; B60T 7/10; B60T 7/107; B60T 7/108; B60T 7/122; B60T 8/00; B60T 8/24; B60T 13/00; B60T 13/66; B60T 2201/03; B60T 2201/06; B60T 2270/10; B60T 2270/30; F16H 61/62; B60L 3/10

USPC .......... 701/36, 70–92; 303/1–17, 188–199, 303/22.1, 57–67; 340/426.32, 450.1, 340/451–454; 188/156, 158

See application file for complete search history.

(56) References Cited

U.S. PATENT DOCUMENTS

| | | | | |
|---|---|---|---|---|
| 4,327,414 A * | 4/1982 | Klein | .............................. | 701/79 |
| 7,104,364 B2 * | 9/2006 | Godlewsky et al. | ..... | 188/1.11 L |
| 7,185,745 B2 * | 3/2007 | Godlewsky et al. | ......... | 188/158 |
| 7,267,206 B2 * | 9/2007 | Dupuis | ......................... | 188/72.8 |
| 7,775,606 B2 * | 8/2010 | Garbe | ......................... | 303/9.62 |
| 2004/0113486 A1 * | 6/2004 | Koga et al. | ..................... | 303/20 |
| 2004/0113489 A1 * | 6/2004 | Iwagawa et al. | .............. | 303/155 |
| 2007/0007817 A1 * | 1/2007 | Nonaga et al. | ............... | 303/155 |
| 2008/0086253 A1 * | 4/2008 | Nakayama | ...................... | 701/80 |
| 2009/0133973 A1 * | 5/2009 | Shibata | ....................... | 188/71.3 |
| 2010/0072811 A1 * | 3/2010 | Kondo et al. | .................. | 303/20 |
| 2010/0219026 A1 * | 9/2010 | Fukasawa et al. | ........... | 188/72.1 |

(Continued)

FOREIGN PATENT DOCUMENTS

WO 2012031797 A1 3/2012

*Primary Examiner* — Thomas Tarcza
*Assistant Examiner* — Tyler J Lee
(74) *Attorney, Agent, or Firm* — LeClairRyan

(57) ABSTRACT

In the case of a method for operating a brake system in a vehicle, preferably a service brake system, in particular in a motor vehicle, it is first established whether the vehicle is stationary. If it is established that the vehicle is stationary, it is thereafter detected that the actuating member is actuated by the driver in order to leave the vehicle in the stationary condition. If it is established that the actuating member is actuated while the vehicle is stationary, a signal is generated at least to initiate the temporary under-supply of service brake medium to the operating members.

14 Claims, 2 Drawing Sheets

(56) References Cited

U.S. PATENT DOCUMENTS

2013/0173130 A1* 7/2013 Vollert et al. .................. 701/70
2013/0226426 A1* 8/2013 Baehrle-Miller et al. ...... 701/70
2013/0226427 A1* 8/2013 Baehrle-Miller et al. ...... 701/70

* cited by examiner

METHOD FOR OPERATING A BRAKE SYSTEM IN A STATIONARY VEHICLE

TECHNICAL FIELD

The present invention relates to a method for operating a brake system, preferably a service brake system in a vehicle, in particular in a motor vehicle.

BACKGROUND OF THE INVENTION

Brake systems of vehicles, in other words of motor vehicles, are known. Vehicles can comprise a service brake system and a parking brake system. The parking brake system is used as a holding brake while the vehicle is parked for an extended period of time, for example, to prevent the vehicle rolling away whilst parked on a slope. Parking brake systems of this type are also described as hand brakes. The service brake system is used for braking the vehicle while the vehicle is in motion. The service brake systems comprise a brake lever as an actuating member that conveys a braking request from the driver to the respective operating members, in other words to the respective brake caliper having conventional components so that that the wheels and consequently the vehicle are/is braked. Known operating media that convey the necessary reactions from the brake lever to the respective operating members are, for example, brake fluids that are arranged in closed systems. The necessary pressure is generated by way of a master brake cylinder, wherein additional control systems such as ESP or ABS systems are known. Systems of this type are widely known and they will therefore not be discussed further. However, when transmitting signals remotely (brake by wire), a fallback level for example of the hydraulic type is also provided for safety reasons.

However, regenerative systems are also known in which the braking energy is recaptured, wherein electrical energy can be generated and stored in an energy storage device. The electrical energy that is generated during the braking operation and thereafter stored can be conveyed as drive energy to the drive chain, wherein the electrical energy can also be fed into the on-board power supply in order to drive electrical energy consumers.

The actuating member can be a brake pedal that is actuated by a foot in order to brake the vehicle while the vehicle is in motion. A brake pedal sensation is set representing the relation between the factors of the brake pedal force to be applied and of the brake pedal travel in conjunction with the actual deceleration of the vehicle. However, the brake pedal sensation in the case of this dynamic requirement is not only dependent upon the aforementioned factors but also upon the vehicle behavior. By way of example, the vehicle obeying the laws of physics is inclined to dip at the front end, the extent of this dip becoming more pronounced the greater the deceleration and/or the more impulsive the deceleration becomes.

The vehicle will therefore be braked by way of the service brake systems. If the vehicle is temporarily stationary, for example at a set of traffic lights, the driver conventionally further actuates the service brake by way of the actuating member in order to maintain the stationary condition of the vehicle. The above mentioned factors, namely a deceleration and the vehicle behavior with respect to the dipping at the front end, are no longer discernible, so that the brake pedal sensation is only set in dependence upon the factors of the brake pedal force to be applied and the brake pedal travel. As is known, a so called "hard brake pedal" is set after a particular actuation time, in which case it is no longer possible for the driver to depress the brake pedal any further if the vehicle is stationary. The fact that an identical brake pedal sensation is always set while the vehicle is stationary is a direct result of the adjustment of the brake pedal sensation during the dynamic requirements, in other words if the vehicle is braked when the vehicle is in motion.

SUMMARY OF THE INVENTION

On the basis of this background, the object of the present invention is to provide an improved method for operating a brake system for vehicles, in which method the driver experiences different feedback signals depending upon the actuation of the actuating member even while the vehicle is stationary.

This object is achieved by way of a method having the features of claim 1. Furthermore, particularly advantageous embodiments of the invention are disclosed in the dependent claims.

The above advantages and other advantages and features will be readily apparent from the following detailed description of the preferred embodiments when taken in connection with the accompanying drawings.

BRIEF DESCRIPTION OF THE DRAWING

For a more complete understanding of this invention, reference should now be made to the embodiments illustrated in greater detail in the accompanying drawing and described below by way of examples of the invention wherein.

DETAILED DESCRIPTION OF THE PREFERRED EMBODIMENTS

Figure 1:
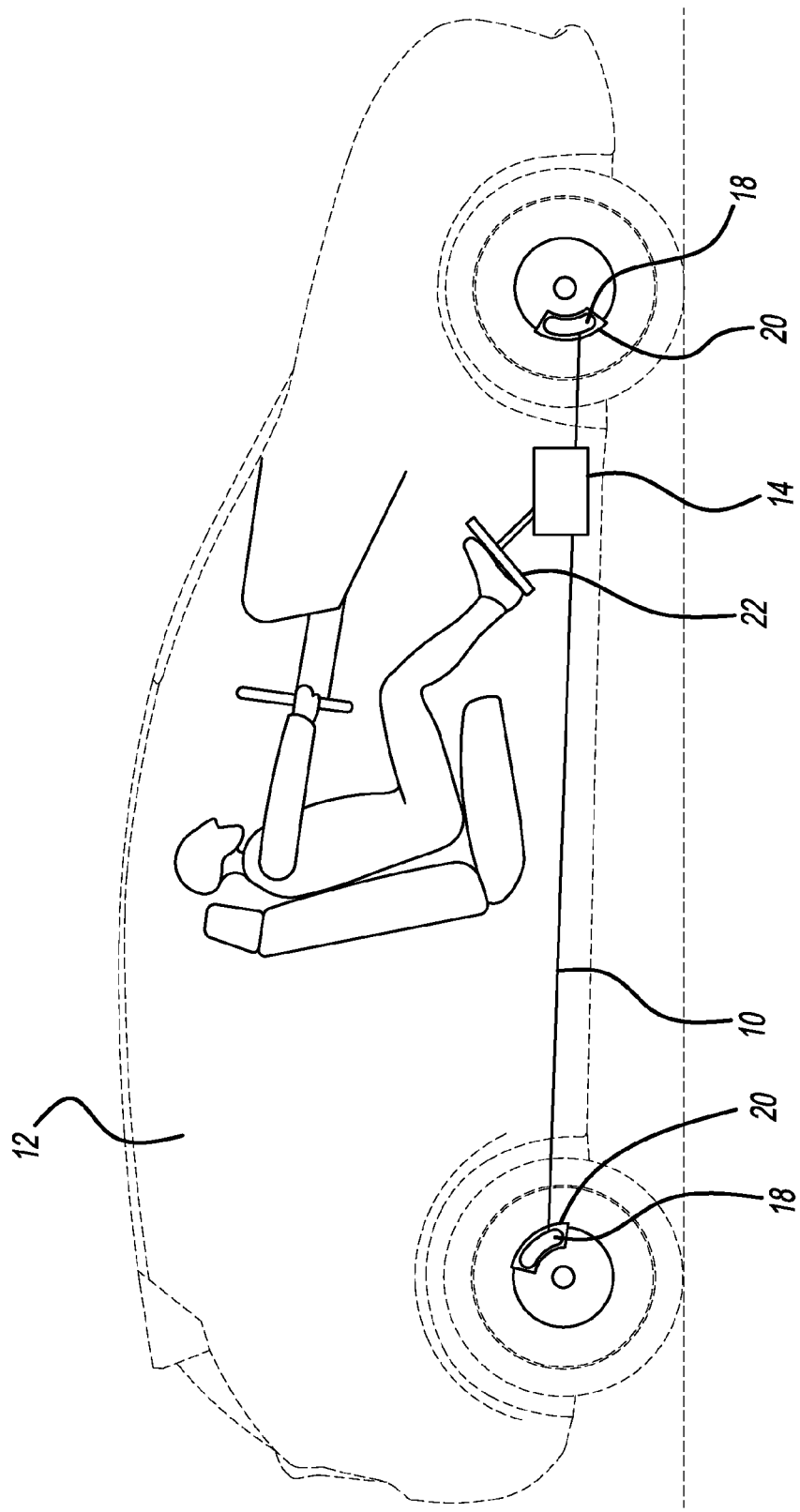
FIG. 1 is a diagrammatic view of a vehicle brake system according to the disclosed inventive concept.

In the attached figure the same reference numerals will be used to refer to the same components. In the following description various operating parameters and components are described for different constructed embodiments. These specific parameters and components are included as examples and are not meant to be limiting.

It is necessary to mention that the features described individually in the following description can be combined with one another in any user-defined, technically expedient manner and said combinations illustrate further embodiments of the invention.

In the case of a method in accordance with the invention for operating a brake system in a vehicle, preferably a service brake system 10, in particular in a motor vehicle 12, it is first established whether the vehicle 12 is stationary. If it is established that the vehicle 12 is stationary, it is thereafter established whether the actuating member 14 is further actuated. If it is established that the vehicle 12 is stationary and that the actuating member 14 is further actuated, a signal is generated at least in order to initiate a temporary under-supply of service brake medium 18 to the operating members 20.

It is achieved by way of the invention that depending upon the requirements of the driver, in other words as different levels of force are introduced into the brake system 10 by way of the brake pedal 22, a correspondingly different brake pedal sensation can be perceived by the driver even while the vehicle 12 is stationary.

Operating members 20 of the service brake system 10 are, for example, brake calipers having brake pads and brake pistons. The operating members 20 can be actuated hydraulically and are connected by way of corresponding hydraulic lines at least to the master brake cylinder so that it is ensured that the supply always corresponds to the particular requirement that is already known. A temporary under-supply to the operating members 20 of the service brake system 10 as defined by the invention means that the entire service brake medium supply is divided while the vehicle 12 is stationary and the actuating member 14 is further actuated, in that valves of the service brake system 10, in, for example, the ESP system, are opened and/or closed so that only one part of the volume flow reaches the operating members 20. The other portion of the volume flow remains in the system 10 or, as is described below, is conveyed to a storage element.

In a further advantageous embodiment, it can be provided that the operating members 20 are completely separated from the service brake medium 18, wherein the valves are closed and/or opened so that the volume flow no longer reaches the operating members 20. It is expedient in this case, if the operating members 20 are held in the last position, in order to maintain the stationary condition of the vehicle 12. This naturally also applies for a partial supply of the service brake medium 18 to the operating members 20.

It is also expedient if the pressure of the service brake medium 18 is reduced with respect to the operating members 20.

The brake pedal sensation can be altered by way of the aforementioned measures in order to provide the driver with a more rigid perception of the brake system 10.

It is defined by the invention that the driver is only provided with a perception of the brake pedal sensation that is expected by the driver if the actuating member 14, in other words the brake pedal 22, is actuated with the applied force and the distance travelled by the brake pedal 22. In order to provide the driver with a softer perception of the brake system 10, a particular volume consumption can be provided that can be achieved, in that either the pre-existing vacuum chamber of an ABS system or a different storage element is used. The stored volume can naturally be used as required.

In order to achieve the object of the invention, it is provided that both measures are combined so that it is possible when using the invention to achieve a respectively different brake pedal sensation when introducing different levels of force into the brake system 10 if the vehicle 12 is stationary.

The individual status requests, and/or signals are to be received by means of sensors that are already provided in the vehicle 12. The sensors indicate the stationary condition of the vehicle 12, wherein further sensors are available to detect the brake pedal travel (travel sensors, angle sensors) and the force applied by the driver.

The ESP system is regarded in terms of the invention by way of example as a hydraulic redistribution element that can determine, control and implement the measures so that by way of a simple fluid flow management of the hydraulic brake fluid an adjustable pedal sensation that corresponds to the requirements of the driver can be easily achieved. It is naturally ensured that the intervention in the brake hydraulic system 10 only then takes place if the vehicle 12 is temporarily stationary. In other words, the method in accordance with the invention is not used if the vehicle 12 is in motion or is decelerated by way of the service brake system 10 or is braked. Even if the vehicle 12 is stationary for an extended period of time, the holding brake will be active if necessary. In order to be able to detect the individual circumstances, sensors are also expedient, which sensors are already arranged in the vehicle 12.

Figure 2:
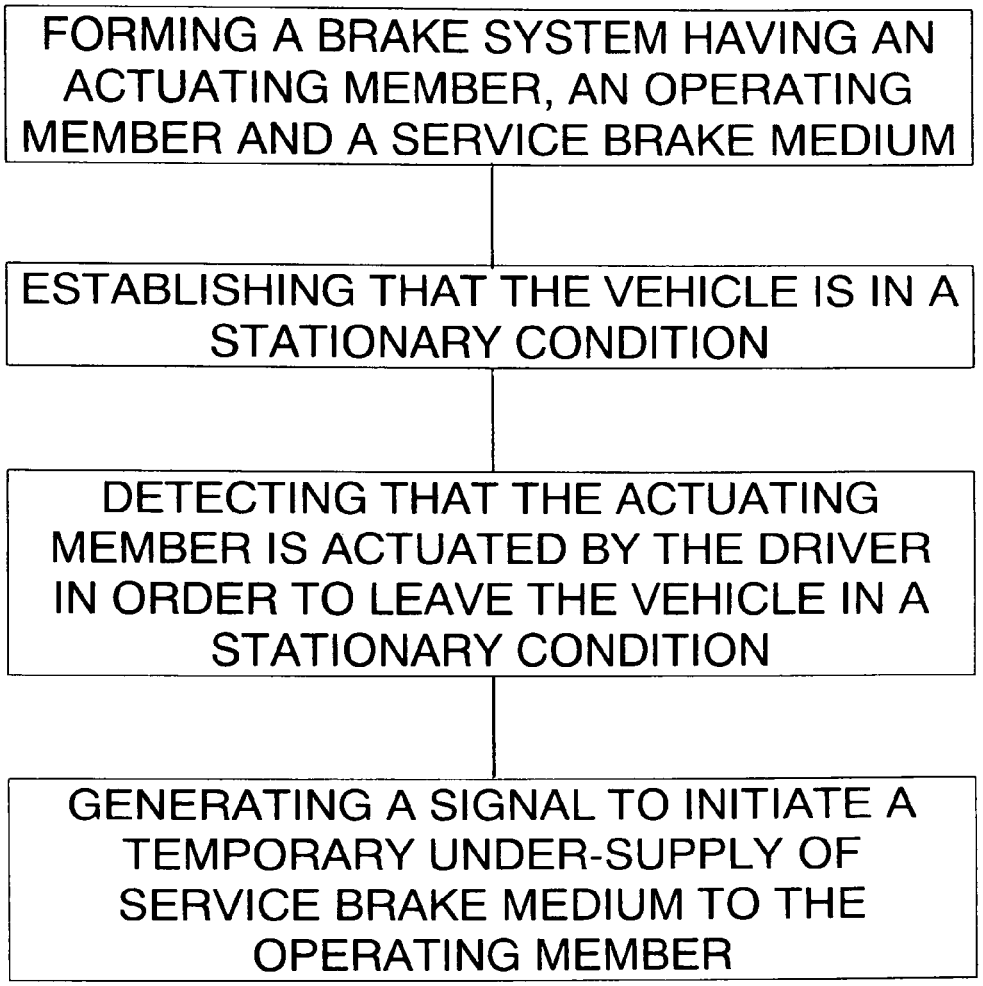
FIG. 2 is a flow chart of the method for operating a brake system in a vehicle according to the disclosed inventive concept.

The method for operating a brake system in a vehicle according to the disclosed inventive concept is summarized in the flow chart shown in FIG. 2.

The invention claimed is:

1. A method for operating a service brake system in a vehicle, the system comprising the steps of:
    forming a unified service brake system comprising an actuating member, an operating member, a service brake medium and valves for controlling medium flow, said valves being selectively movable between an open position and a closed position;
    establishing that the vehicle is stationary by reception of a signal from at least a stationary vehicle condition sensor and a actuating member sensor,
    determining that the actuating member is actuated by a driver in order to keep the vehicle in a stationary condition,
    wherein a signal is generated to initiate a temporary under-supply of the service brake medium to the operating member resulting in the operating member being separated from the service brake medium, and wherein said valves are selectively positioned in one of said closed position or said open position so that said service brake medium no longer flows to said operating member.

2. The method as claimed in claim 1, wherein a signal is generated to initiate the temporary interruption of the supply of service brake medium to the operating members.

3. The method as claimed in claim 2, wherein a pressure of the service brake medium on the operating members is reduced.

4. The method as claimed in claim 2, further including an electronic stability program (ESP) system, wherein the electronic stability program (ESP) system is the element for hydraulically distributing the service brake medium while the vehicle is temporarily stationary and the actuating member is further actuated.

5. The method as claimed in claim 1, wherein a pressure of the service brake medium on the operating members is reduced.

6. The method as claimed in claim 5, further including an electronic stability program (ESP) system, wherein the electronic stability program (ESP) system is the element for hydraulically distributing the service brake medium while the vehicle is temporarily stationary and the actuating member is further actuated.

7. The method as claimed in claim 1, further including an ESP system, wherein the electronic stability program (ESP) system is the element for hydraulically distributing the service brake medium while the vehicle is temporarily stationary and the actuating member is further actuated.

8. A method for operating a service brake system in a vehicle comprising the steps of:
    forming a unified service forming a brake system having an actuating member, an operating member, a service brake medium, and a stationary vehicle condition sensor$_s$ and valves for controlling medium flow, said valves being selectively movable between an open position and a closed position;
    establishing that the vehicle is in a stationary condition by operation of said sensor;
    detecting said condition;

detecting that said actuating member is actuated by the driver to place the vehicle in said condition; and generating a signal initiating temporary under-supply of said service brake medium to said operating member, whereby said operating member is separated from said service brake medium, wherein said valves are selectively positioned in one of said closed position or said open position opened such that only a portion of said service brake medium flows to said operating member.

9. The method as claimed in claim 8, wherein a signal is generated to initiate the temporary interruption of the supply of service brake medium to the operating members.

10. The method as claimed in claim 9, wherein a pressure of the service brake medium on the operating members is reduced.

11. The method as claimed in claim 9, further including an electronic stability program (ESP) system, wherein the electronic stability program (ESP) system is the element for hydraulically distributing the service brake medium while the vehicle is temporarily stationary and the actuating member is further actuated.

12. The method as claimed in claim 8, wherein a pressure of the service brake medium on the operating members is reduced.

13. The method as claimed in claim 12, further including an electronic stability program (ESP) system, wherein the electronic stability program (ESP) system is the element for hydraulically distributing the service brake medium while the vehicle is temporarily stationary and the actuating member is further actuated.

14. The method as claimed in claim 8, further including an electronic stability program (ESP) system, wherein the electronic stability program (ESP) system is the element for hydraulically distributing the service brake medium while the vehicle is temporarily stationary and the actuating member is further actuated.

* * * * *